Dec. 16, 1930.  T. P. FESKO  1,784,962
CONVERTIBLE AUTOMOBILE BODY
Filed Nov. 30, 1929  2 Sheets-Sheet 1
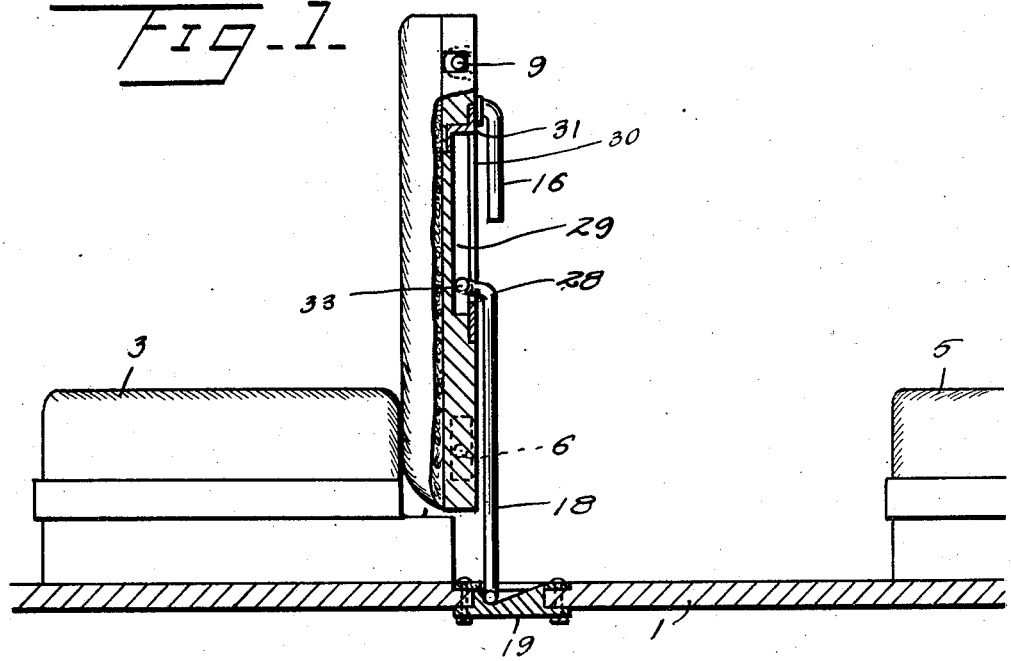
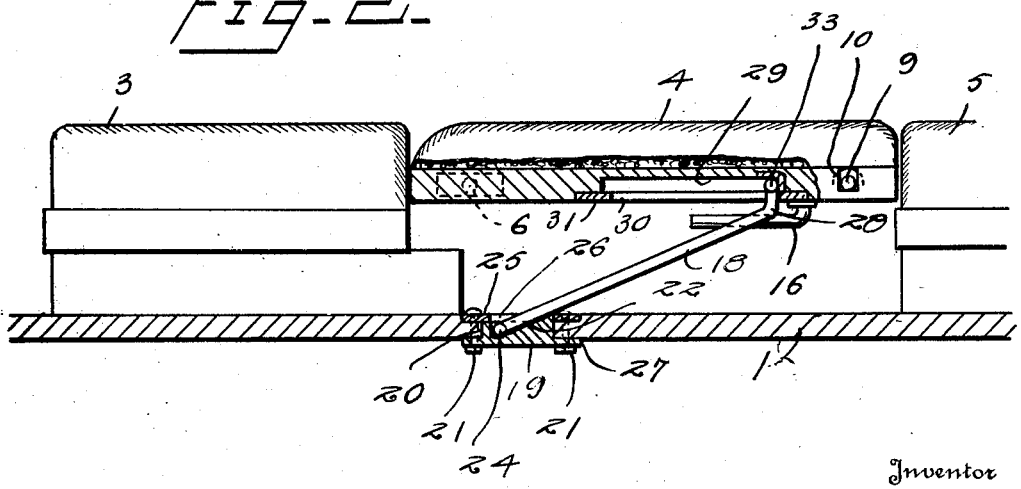
Inventor
T. P. Fesko
By Watson E. Coleman
Attorney

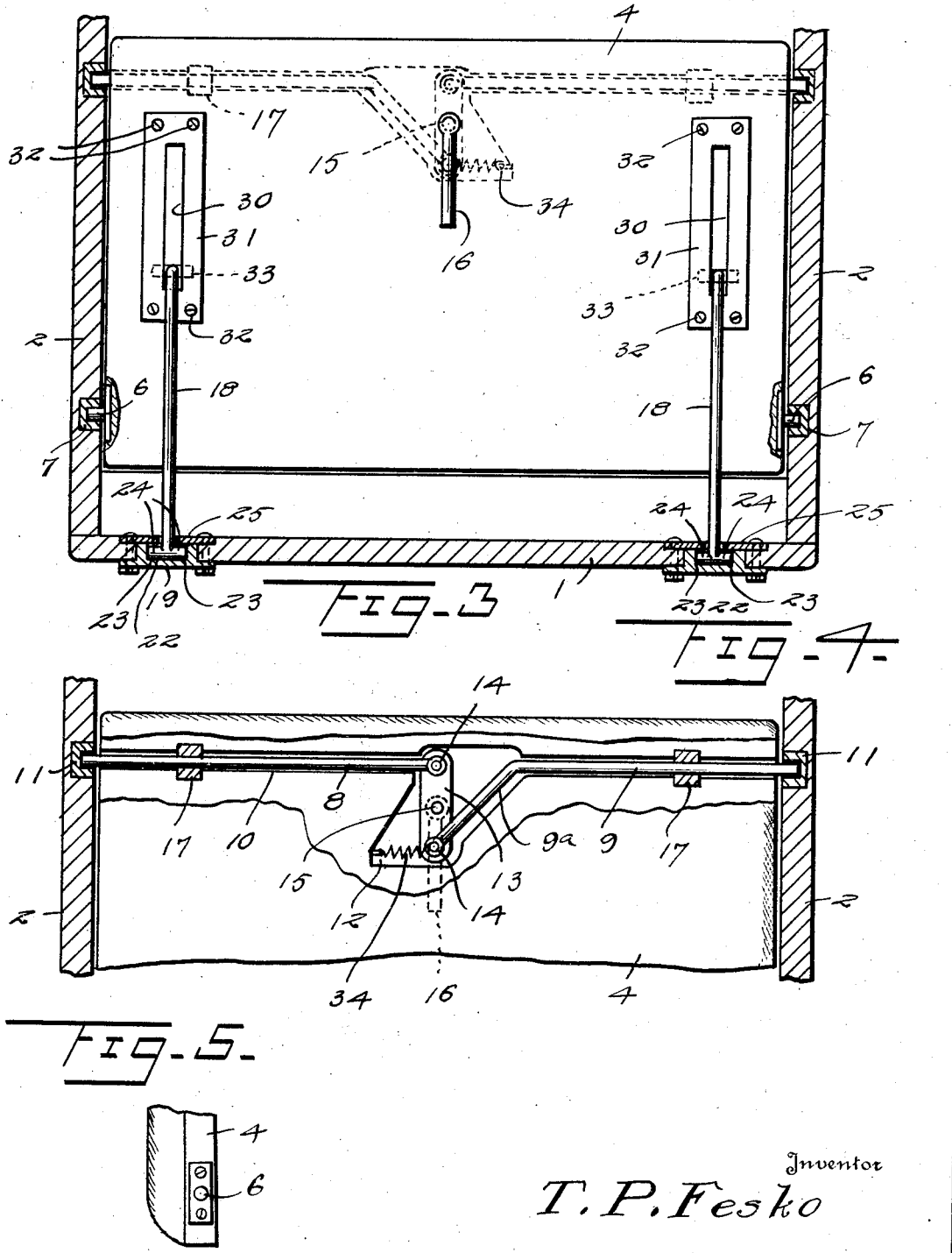

Patented Dec. 16, 1930

1,784,962

UNITED STATES PATENT OFFICE

THOMAS P. FESKO, OF ECORSE, VIA DETROIT, MICHIGAN

CONVERTIBLE AUTOMOBILE BODY

Application filed November 30, 1929. Serial No. 410,790.

This invention relates to a convertible automobile body of that type wherein the back of the front seat is adapted to be lowered into alinement with the bottoms of the front and rear seats so as to provide a bed.

The invention has for one of its objects to provide an automobile body of the character stated wherein the back of the front seat shall be supported in normal or upright position by novel and simple means adapted to be easily and quickly operated to effect the release of the back for movement into horizontal or bed forming position.

The invention has for a further object to provide an automobile body of the character stated wherein the back of the front seat shall be supported in bed forming position by pins through the medium of which it is pivoted for movement from one of its positions to the other and by braces so connected to the back and to the floor of the body as to prevent them from accidental movement from their back supporting position, the connection between the braces, back and bottom being such as to also hold the braces against rattling when the back is in upright position.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in side elevation and partly in vertical section of a convertible automobile body embodying my invention, the back of the front seat being shown in normal or raised position;

Figure 2 is a view similar to Figure 1 with the back of the front seat in horizontal bed forming position;

Figure 3 is a view with the floor and sides of the body in transverse section and with the back of the front seat in rear elevation and having lower portions of the back in vertical section;

Figure 4 is a view with the sides of the body in transverse section and with the upper portion of the back of the front seat broken away, and Figure 5 is a view in end elevation of the lower portion of the back of the front seat.

Referring in detail to the drawings, 1 designates the floor and 2 the sides of an automobile body. 3 designates the bottom and 4 the back of the front seat of the automobile body, and 5 designates the bottom of the rear seat of the automobile body. These parts may be of any well known or appropriate construction.

The back 4 is pivotally connected adjacent its lower side to the sides 2 through the medium of pins 6 fixed to the ends of the back and sockets 7 recessed in the sides. The back 4 is releasably supported in its normal or upright position by bolts 8 and 9 which are slidably mounted in the bore 10 extending longitudinally through the back near the upper side thereof. The bolts 8 and 9 project beyond the ends of the back 4 and engage in sockets 11 recessed in the sides 2. The back 4 is provided centrally between the ends of the bore 10 with a recess 12 which extends downwardly from and communicates at its upper end with the bore. The inner end of the bolt 8 is arranged within the upper end of the recess 12, and the bolt 9 is provided with a downwardly inclined end portion $9^a$ which is also arranged within the recess with its lower end in vertical alinement with the inner end of the bolt 8. A link 13 is pivotally connected, as at 14, to the inner ends of the bolts 8 and 9. A shaft 15 is fixed to the link 13 centrally between the ends of the latter, and is journaled in and extends rearwardly from the back 4. A handle 16 is secured to the rear end of the shaft 15 and extends downwardly therefrom. To insure the free sliding movement of the bolts 8 and 9, bearings 17 are provided, the bearings slidably receiving the bolts and extending across the bore 9.

Braces 18, which are pivotally connected to the floor 1 and are pivotally and slidably connected to the rear side of the back 4, cooperate with the pins 6 to support the back 4 in horizontal or bed forming position. Pivot bearings 19 are arranged in openings 20 formed in the floor 1 and are secured to the floor by bolts 21. The bearings 19 are located near the rear side of the bottom 3, and are provided in their upper sides with recesses 22 extending longitudinally of the automobile body. The bottom walls of the recesses 22 incline upwardly and rearwardly and the side walls of the recesses are provided near their front ends with sockets 23 which have open upper sides. The lower ends of the braces 18 are arranged in the recesses 22, and are provided with lateral lugs 24 arranged in the sockets 23, to pivotally connect the braces to the bearings 19. The brace lugs 24 are held in the sockets 23 and the bearings 19 by plates 25 which are provided with slots 26 which aline with the recesses 22, and through which the lower ends of the braces 18 extend. The plates 25 contact with the upper side of the floor 1, and flanges 27 formed on the bearings 19 contact with the lower side of the floor, the bolts 21 extending through the floor, plates and flanges to secure the bearings and plates in place.

The braces 18 have angular upper ends 28 which extend forwardly therefrom and are slidably arranged in vertical recesses 29 formed in the rear side of the back 4. The brace ends 28 extend through vertical slots 30 in plates 31 which are secured, as at 32, to the rear side of the back 4 over the recesses 29. The slots 30 are narrower than the recesses 29, and lugs 33, which extend laterally from the brace ends 28 and arranged in the recesses 29, contact with the rear sides of the plates 31 to pivotally and slidably connect the braces 18 to the back 4.

The bolts 8 and 9 are yieldingly held in socket engaging position by a coil spring 34 which is arranged in the recess 12 between the lower end of the link 13 and a side wall in the recess.

It should be understood from the foregoing description, taken in connection with the accompanying drawings, that the back 4 of the front seat is mounted in a manner to permit it to be lowered between and in horizontal alinement with the bottom 3 of the front seat and the bottom 5 of the rear seat, that to free the back 4 for movement into horizontal or bed forming position, it is only necessary to retract the bolts 8 and 9 which may be readily done through the medium of the handle 16, and that the back 4 is supported in horizontal or bed forming position by the pivot pins 6 and the braces 18. When the back 4 is in horizontal or bed forming position, the braces 18 incline upwardly and forwardly from the bearings 19 with their lower end portions resting against inclined bottom walls of the recesses 22 of the bearings and with their upper ends in contact with the rear end walls of the recesses 29, with the result that the back is firmly supported in this position. As the braces 18 are pivotally engaged with the bearings 19, all danger of the braces moving accidently from their back supporting condition is avoided. The bolts 8 and 9 firmly secure the back 4 in its normal or raised position, and when the back is in this position, the lower ends of the braces 18 are engaged with the bearings 19 with the result that rattling of the braces is obviated.

It will be further understood that the structure is simple, durable and capable of being manufactured and installed at comparatively low cost, that the braces 18 automatically assume their back supporting position, and that the braces will not interfere with the movement of the back 4 into its horizontal or bed forming position or into its normal upright position.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

In a convertible automobile body having the back of its front seat supported for movement from its normal position into a horizontal or bed forming position, bearings passing through the floor of the body and provided with flanges contacting with the under side of the floor, the bearings being provided in their upper sides with recesses having upwardly and rearwardly inclined bottom walls, the side walls of the recesses being provided in their front ends with sockets open at their upper sides, plates contacting with the upper side of the floor and closing said sockets and provided with slots registering with said recesses, bolts passing through the flanges and plates and through the floor, braces having their lower ends arranged in the bearing recesses and passing through the slots in the plates, lateral lugs carried by said ends of the braces, and arranged in the bearing sockets, and means pivotally and slidably connecting the upper ends of the braces to the back, the braces being adapted to occupy an upwardly and forwardly inclined position with the lower end portions in contact with the bottom walls of the bearing recesses when the seat is in horizontal position.

In testimony whereof I hereunto affix my signature.

THOMAS P. FESKO.